(12) United States Patent
Kuroda et al.

(10) Patent No.: US 9,727,990 B2
(45) Date of Patent: Aug. 8, 2017

(54) GRAPH DISPLAY DEVICE, METHOD AND COMPUTER-READABLE MEDIUM

(71) Applicant: Kabushiki Kaisha Toshiba, Minato-ku (JP)

(72) Inventors: Akira Kuroda, Yokohama (JP); Hidenori Matsuzaki, Fuchu (JP); Mayuko Koezuka, Ota (JP); Nobuaki Tojo, Tachikawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/858,033

(22) Filed: Sep. 18, 2015

(65) Prior Publication Data

US 2016/0093075 A1    Mar. 31, 2016

(30) Foreign Application Priority Data

Sep. 29, 2014   (JP) ................................ 2014-198458

(51) Int. Cl.
*G06T 11/20*    (2006.01)
*G06F 17/30*    (2006.01)

(52) U.S. Cl.
CPC ........ *G06T 11/206* (2013.01); *G06F 17/3051* (2013.01); *G06F 17/30477* (2013.01); *G06F 17/30507* (2013.01); *G06F 17/30522* (2013.01); *G06F 17/30551* (2013.01)

(58) Field of Classification Search
None
See application file for complete search history.

(56) References Cited

U.S. PATENT DOCUMENTS 5,379,424 A * 1/1995 Morimoto ......... G06F 17/30463
707/758

FOREIGN PATENT DOCUMENTS

JP    2009-245128      10/2009
JP    2009245128    * 10/2009    ............. G06F 3/048

* cited by examiner

*Primary Examiner* — Vu Nguyen
(74) *Attorney, Agent, or Firm* — Oblon, McClelland, Maier & Neustadt, L.L.P.

(57) ABSTRACT

A graph display device includes a condition receiver, a time information display circuitry, an instruction receiver and a graph display circuitry. The condition receiver receives a condition for specifying at least one data item from graph data including a plurality of data items. The time information display circuitry displays time information relative to a time to display a graph based on the specified data item. The instruction receiver receives an instruction for starting display of the graph. The graph display circuitry displays the graph when the instruction is received.

15 Claims, 15 Drawing Sheets

FIG. 5

GRAPH DATA

| RECORD | TIME SERIES PARAMETER | NUMERICAL PARAMETER |
|---|---|---|
| | 1 | 10 |
| | 2 | 21 |
| | 3 | 31 |
| | 5 | 15 |
| | 8 | 52 |
| | 10 | 23 |
| | 12 | 25 |
| | 14 | 1 |
| | 19 | 44 |
| | 20 | 12 |
| | 24 | 2 |
| | 30 | 11 |
| | 31 | 22 |
| | 32 | 43 |
| | ⋮ | ⋮ |
| | 130 | 44 |
| | ⋮ | ⋮ |

FIRST ELEMENT (WITH TIME SERIES ATTRIBUTE) | SECOND ELEMENT (WITH NUMERICAL ATTRIBUTE)

PROGRAM STRUCTURE

FIG. 17

|  | GRAPH DATA | | |
|---|---|---|---|
| PROGRAM STRUCTURE DATA → | FileA:FuncA:ScopeA | 10 | Core 4 |
|  | FileA:FuncA:ScopeB | 21 | Core 3 |
| RECORD → | FileA:FuncA:LoopA | 31 | Core 3 |
|  | ⋮ | ⋮ | ⋮ |
|  | FileA:FuncB:LoopB | 15 | Core 1 |
|  | FileA:FuncB:LoopB:LoopC | 52 | Core 2 |
|  | FileA:FuncB:LoopB:LoopD | 23 | Core 3 |
|  | ⋮ | ⋮ | ⋮ |
|  | FileB:FuncC:ScopeA | 2 | Core 1 |
|  | ⋮ | ⋮ | ⋮ |

FIRST ELEMENT (WITH PROGRAM STRUCTURE DATA ATTRIBUTE)

SECOND ELEMENT (WITH PERFORMANCE TIME ATTRIBUTE)

THIRD ELEMENT (WITH CPU CORE INFORMATION ATTRIBUTE)

GRAPH DISPLAY DEVICE, METHOD AND COMPUTER-READABLE MEDIUM

CROSS-REFERENCE TO RELATED APPLICATION

This application is based upon and claims the benefit of priority from Japanese Patent Application No. 2014-198458, filed Sep. 29, 2014; the entire contents of (all of) which are incorporated herein by reference.

FIELD

Embodiments of the present invention relate to a graph display device, method and a computer-readable medium.

BACKGROUND

Graph display devices for making graphs based on numerical data and displaying the graphs on a display screen in order to visually represent the features and trends of the numerical data are widely used. In such a graph display device, a user can variously designate a numerical data range, a graph form, and the like to be used to make graphs.

Also, recently, in various fields, research and development using big data have been carried out. Even in the use of those big data, it is very important and widely demanded to analyze numerical data to make graphs.

However, in big data processing, if where the amount of data to be handled is huge and a general computer is used, depending on a request of a user, it may take a long time to make and display a graph. In this case, since the user cannot grasp a time necessary to make and display the graph, it is inconvenient.

BRIEF DESCRIPTION OF THE DRAWINGS

FIG. 5 is a view illustrating an example of graph data which a storage module 14 stores.

FIG. 17 is a view illustrating an example of the graph data which the storage module 24 stores.

DETAILED DESCRIPTION

Figure 1:
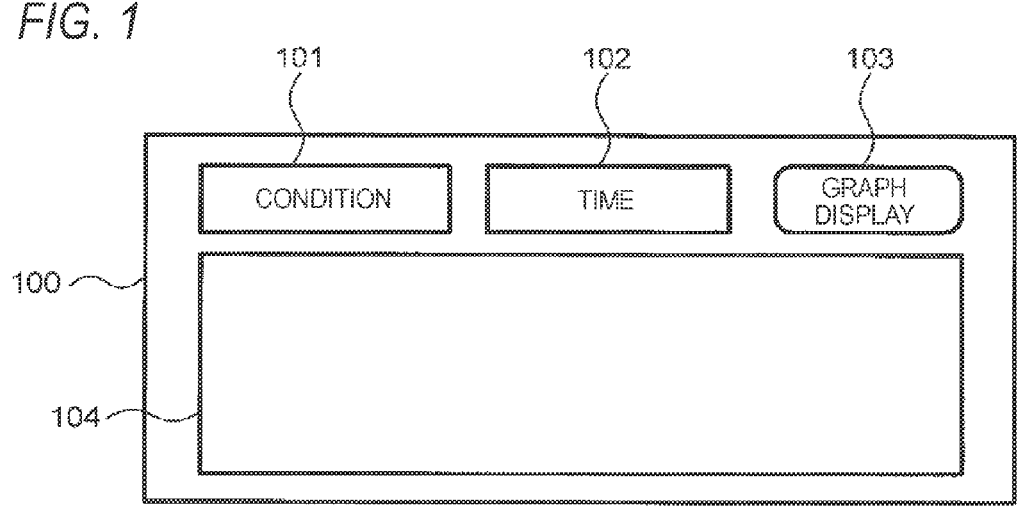
FIG. 1 is a view illustrating an example of a display screen 100 of a graph display system 1 according to a first embodiment.

Various Embodiments will be described hereinafter with reference to the accompanying drawings. Throughout this specification and the drawings, components identical to those described in regard to previous drawings are marked with the same reference numerals, and detailed descriptions thereof may be omitted as appropriate. According to one embodiment, a graph display device includes a condition receiver, a time information display circuitry, an instruction receiver and a graph display circuitry. The condition receiver receives a condition for specifying at least one data item from graph data including a plurality of data items. The time information display circuitry displays time information relative to a time to display a graph based on the specified data item, on at least one display. The instruction receiver receives an instruction for starting display of the graph. The graph display circuitry displays the graph when the instruction is received, on the display.

First Embodiment

A graph display system 1 according to a first embodiment is a system capable of generating a graph based on numerical data and displaying the graph. From a user, the graph display system 1 receives a condition relative to a graph to be displayed. The graph display system 1 obtains time information relative to graph generation from the received condition. If receiving a graph display instruction from the user, the graph display system 1 starts to generate the graph and displays the graph on a display screen.

As a result, the user can grasp a time required to display the graph, in advance, and determine whether to make the system generate and display the graph. Therefore, it is possible to reduce the psychological burden of the user.

Graphs which are mentioned in the present embodiment may be any diagrams which can be generated corresponding to received conditions, such as a scatter plot, a pie graph, a bar graph, a polygonal line graph, an area graph, a Gantt chart, a box plot, a table, a correlation diagram, a bitmap, a tree chart, and a matrix map.

FIG. 1 is a view illustrating an example of a display screen 100 of the graph display system 1. The graph display system 1 displays a condition input screen 101, a time information display screen 102, a display instruction button 103, and a graph display screen 104 on the display screen 100. The condition input screen 101 is a screen for enabling the user to input a condition relative to a graph to be displayed. The time information display screen 102 is a screen for displaying time information relative to graph display from the received condition. The display instruction button 103 is a button for inputting a graph display instruction. The graph display screen 104 is a screen for displaying a generated graph.

Figure 2:
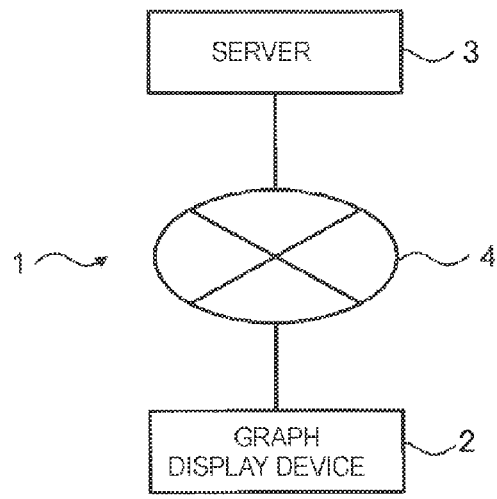
FIG. 2 is a view illustrating the configuration of the graph display system 1.

FIG. 2 is a view illustrating the configuration of the graph display system 1. The graph display system 1 includes a graph display device 2 and a server 3. The graph display device 2 and the server 3 are connected through a network 4 such as the Internet.

The graph display device 2 is a device which can be operated by the user, and is, for example, an information processing terminal such as a personal computer (PC), a tablet PC, or a smart phone. The server 3 performs at least a portion of a process of generating a graph to be displayed on the graph display device 2. In FIG. 2, one graph display device 2 and one server 3 are shown. However, the number of graph display devices 2 or the number of servers 3 may be two or more.

Figure 3:
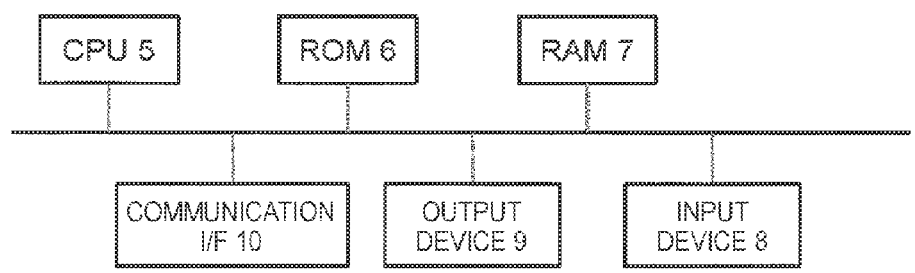
FIG. 3 is a view illustrating an example of the hardware configurations of a graph display device 2 and a server 3.

FIG. 3 is a view illustrating an example of the hardware configurations of the graph display device 2 and the server 3. The graph display device 2 and the server 3 have a configuration which can be used in a general computer, and include a central processing module (CPU) 5, which includes a processor, a controller and the like, a read only memory (ROM) 6, a random access memory (RAM) 7, an input device 8, an output device 9, and a communication I/F 10. The CPU 51 uses the RAM 7 as a work area to perform predetermined calculating processes according to a control program stored in the ROM 6 or the like. The input device 8 is a device for inputting information from the outside, and is, for example, a keyboard, a mouse, a touch panel, and the like. The output device 9 is a device for outputting information generated inside to the outside, and is, for example, a display. The communication I/F 10 is a device making it possible to perform information communication with an external device through the network 4.

Figure 4:
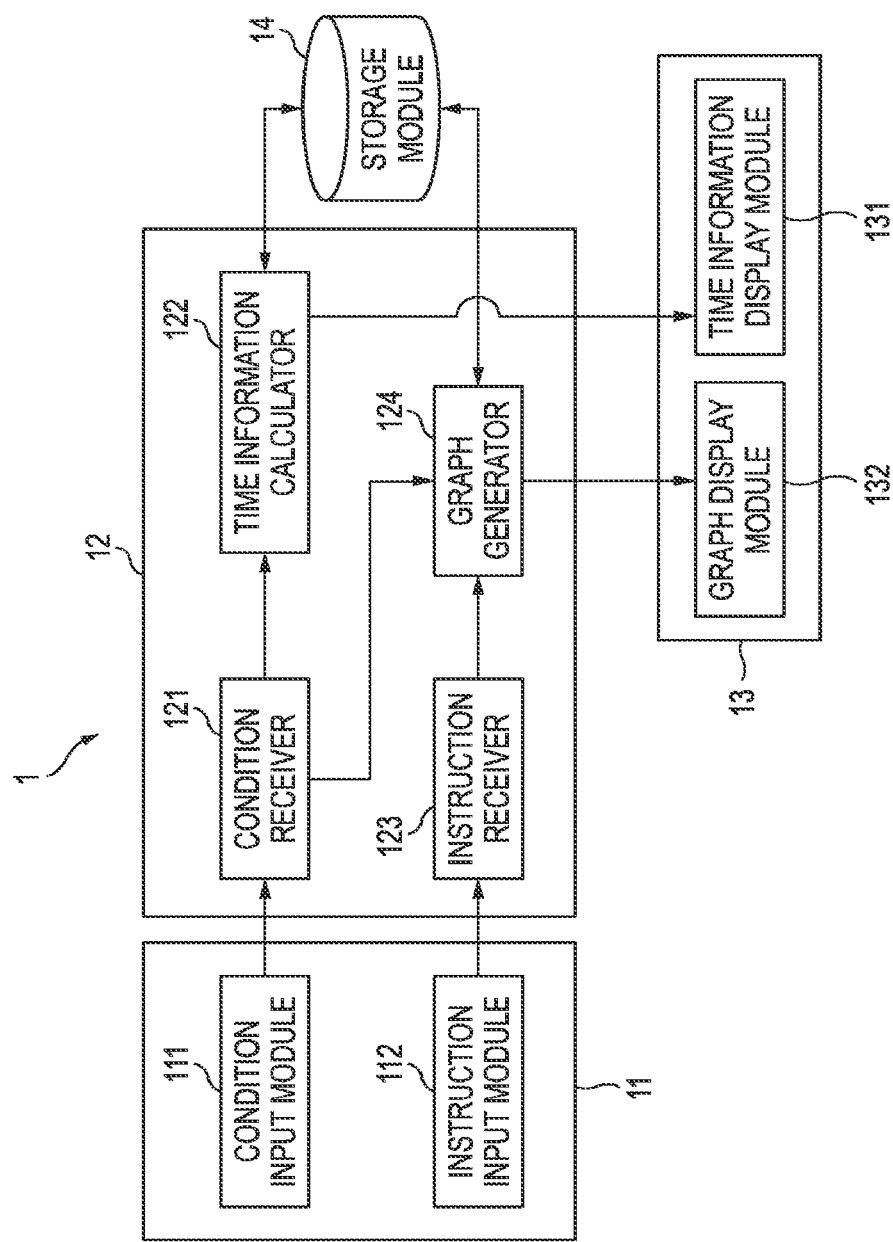
FIG. 4 is a view illustrating the functional blocks of the graph display system 1.

FIG. 4 is a view illustrating the functional blocks of the graph display system 1. The graph display system 1 includes an input module (an input circuitry) 11, a processing module (a processor) 12, a display module (a display) 13, and a storage module (which includes a storage circuitry, memory and the like) 14. In the present embodiment, the graph display device 2 includes the input module 11, the processing module 12, and the display module 13. The server 3 includes the storage module 14.

The storage module 14 stores graph data which is used for graph generation, and management data. FIG. 5 is a view illustrating an example of the graph data which the storage module 14 stores. The storage module 14 stores the graph data composed of a first element and a second element associated with each other. The first element includes a plurality of time series parameters having a time series attribute. In the present embodiment, on the assumption that the time series parameters are expressed in seconds, a description will be made. The second element includes a plurality of numerical parameters corresponding to the time series parameters and having a numerical attribute. That is, each element includes a plurality of parameters having a common attribute.

In the present embodiment, a pair of one time series parameter and a numerical parameter corresponding to that time series parameter will be referred to as a record. In the example of FIG. 5, a pair of a time series parameter "1" and a numerical parameter "10" corresponding thereto is one record. That is, data of the present embodiment is expressed as a set of records.

Figure 6:
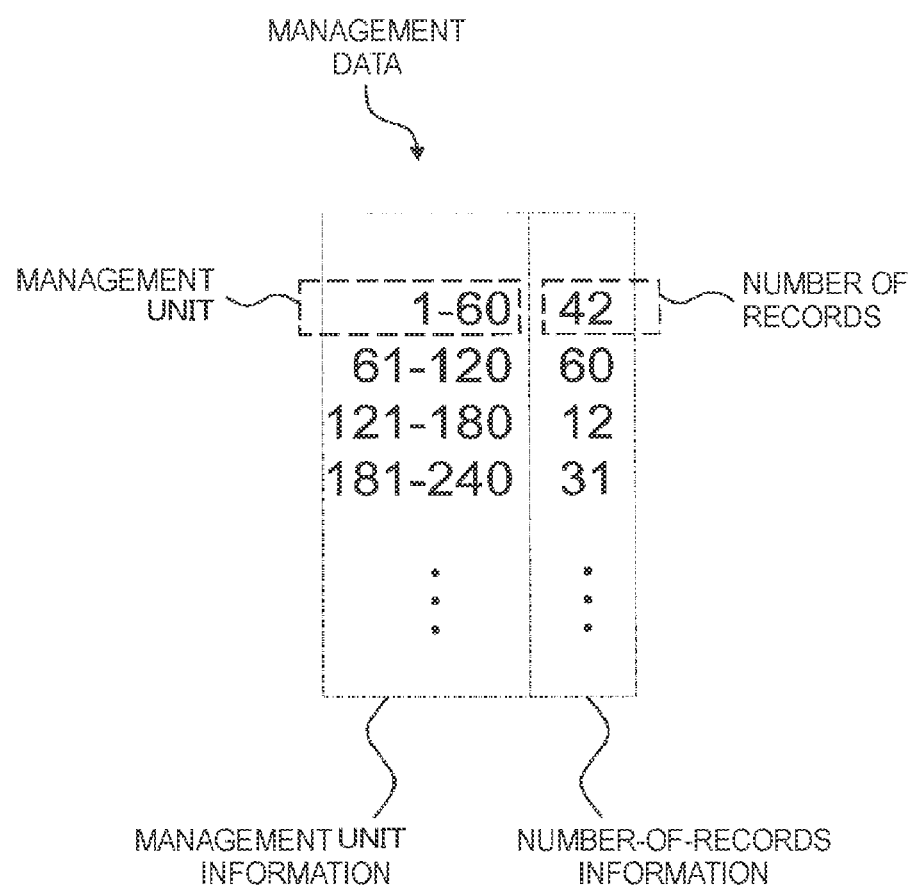
FIG. 6 is a view illustrating an example of management data which the storage module 14 stores.

FIG. 6 is a view illustrating an example of the management data which the storage module 14 stores. The storage module 14 stores management unit information and number-of-records information in association with each other. The management unit information is a set of units (referred to as management units) obtained by dividing the time series parameters in units of a predetermined range. In the example of FIG. 6, the time series parameters are divided in units of 60 seconds, and each unit is set as one management unit. Each number-of-records information item represents the number of records including time series parameters included in a corresponding management unit. In the example of FIG. 6, it is shown that there are 42 records including time series parameters included in a management unit from 1 second to 60 seconds.

The input module 11 includes a condition input module (a condition input circuitry) 111 and an instruction input module (an instruction input circuitry) 112. The processing module 12 includes a condition receiver 121, a time information calculator 122, an instruction receiver 123, and a graph generator 124. The display module 13 includes a time information display module (a time information display circuitry) 131 and a graph display module (a graph display circuitry) 132.

The condition input module 111 inputs a condition relative to a graph to be displayed, according to designation of the user. In the present embodiment, a condition is for designating one or more time series parameters in the first element of the graph data stored in the storage module 14. For example, a condition of the present embodiment may be for designating a time series parameter range in the first element of the graph data. Alternatively, a condition of the present embodiment may be time series parameters equal to or greater than a predetermined threshold value, time series parameters equal to or less than a predetermined threshold value, time series parameters equal to a predetermined value, or a combination thereof.

The instruction input module 112 inputs a graph display instruction according to designation of the user.

The condition receiver 121 receives the condition input by the condition input module 111. Based on the received condition, the time information calculator 122 acquires the management data from the storage module 14. By using the acquired management data, the time information calculator 122 acquires number-of-records information satisfying the received condition. Based on the acquired number-of-records information, the time information calculator 122 calculates time information.

The instruction receiver 123 receives a graph display instruction input by the instruction input module 112. In a case where the instruction receiver 123 receives the graph display instruction, the graph generator 124 acquires graph data items satisfying the condition received by the condition receiver 121, from the storage module 14, and generates a graph based on the acquired graph data items.

The time information display module 131 displays the time information generated by the time information calculator 122. The graph display module 132 displays the graph generated by the graph generator 124.

Until now, the configuration of the graph display system 1 has been described.

Figure 7:
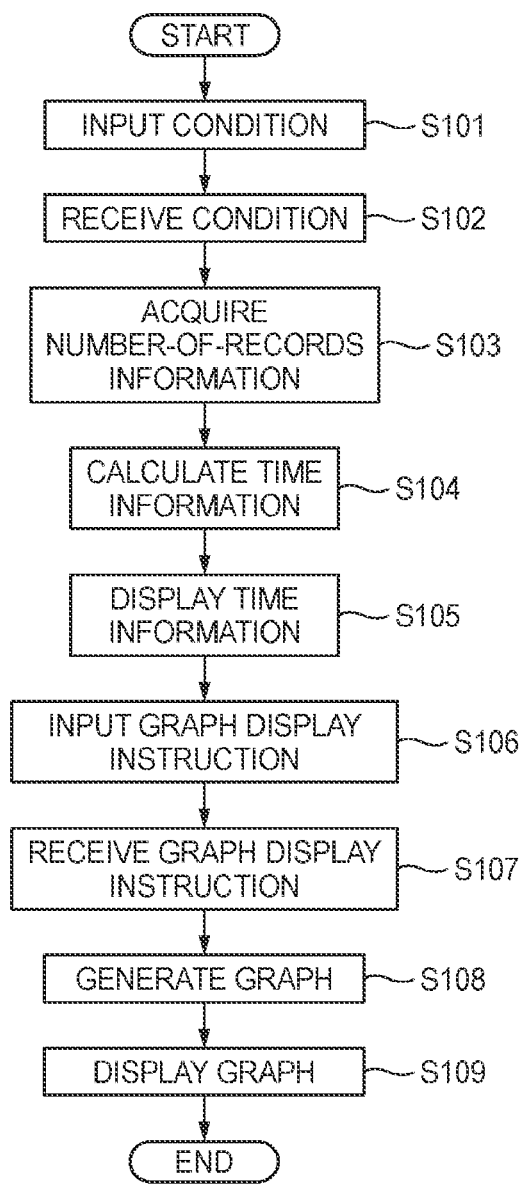
FIG. 7 is a flow chart illustrating a process of the graph display system 1.

FIG. 7 is a flow chart illustrating a process of the graph display system 1. In STEP S101, the condition input module 111 inputs a condition relative to a graph to be displayed, according to designation of the user. In the present embodiment, the input condition is displayed on the condition input screen 101 of the display screen 100 shown in FIG. 1.

For example, the condition input module 111 inputs a condition to designate a time series parameter range from 30 seconds to 130 seconds in the first element. This condition is referred to as a condition "A".

In STEP S102, the condition receiver 121 receives the input condition. The condition receiver 121 supplies the received condition to the time information calculator 122 and the graph generator 124.

In STEP S103, with reference to the management data of the storage module 14, the time information calculator 122 acquires number-of-records information corresponding to management unit information satisfying the received condition.

For example, in a case where the condition receiver 121 receives the condition "A", the time information calculator 122 searches the management unit information for management units including the time series parameter range from 30 seconds to 130 seconds, with reference to the management data of the storage module 14. In the case of FIG. 6, a time series parameter section from 30 seconds to 60 seconds is included in a management unit "1-60", and a time series parameter section from 61 seconds to 120 seconds is included in a management unit "61-120", and a time series parameter section from 121 seconds to 130 seconds is included in a management unit "121-180".

Therefore, the time information calculator 122 acquires a number-of-records information item "42" corresponding to the management unit "1-60", a number-of-records information item "60" corresponding to the management unit "61-120", and a number-of-records information item "12" corresponding to the management unit "121-180".

Since the storage module 14 stores the management unit information, the time information calculator 122 can acquire the approximate number of records with reference to the graph data stored in the storage module 14, without counting all of the numbers of records satisfying the received condition. Therefore, it is possible to accelerate processing until time information calculation of the next step.

In STEP S104, the time information calculator 122 calculates time information from the acquired number-of-records information.

The time information may be calculated based on the number of records and time information (referred to as unit time information) per one record. For example, unit time information per one record may be calculated based on a graph drawing time per one record, a graph generating time per one record, a graph data transmitting time per one record, a graph data acquiring time per one record, or a combination thereof.

The time information calculator 122 may hold predetermined unit time information, and calculate the time information based on the acquired number-of-records information and the unit time information held in advance.

Also, the time information may be calculated based on a data size (such as the number of bytes) and unit time information per unit data size. In this case, the unit time information may be determined per one data size (for example, per one byte).

In the present embodiment, the time information calculator 122 calculates the time information by multiplying the acquired number-of-records information and the unit time information. For example, in a case where the condition receiver 121 receives the condition "A", the time information calculator 122 multiplies the acquired number-of-records information "114 (=42+60+12)" and the unit time information (10 milliseconds for one record), thereby acquiring time information "1140 milliseconds (114 records×10 milliseconds)".

The time information calculator 122 supplies the calculated time information to the time information display module 131.

In STEP S105, the time information display module 131 displays the time information. In the present embodiment, the time information display module 131 displays the time information on a time information display screen 102 of the display screen 100 shown in FIG. 1.

For example, in a case where the condition receiver 121 receives the condition "A", the time information display module 131 displays the time information "1140 milliseconds" calculated by the time information calculator 122.

In STEP S106, the instruction input module 112 inputs a graph display instruction according to designation of the user. In the present embodiment, if the user designates the display instruction button 103 of the display screen 100 shown in FIG. 1 with the input device 8 such as a mouse and a keyboard, the instruction input module 112 inputs a graph display instruction.

With respect to STEP S106 and the subsequent steps, a case where a graph display instruction is input will be described. In a case where a graph display instruction is not input, the graph display system 1 stands by in STEP S105, or transitions to STEP S101 in which a new condition is input.

In STEP S107, the instruction receiver 123 receives the graph display instruction input by the instruction input module 112. The instruction receiver 123 supplies the received instruction to the graph generator 124.

In STEP S108, the graph generator 124 acquires records corresponding to the condition received by the condition receiver 121, from the graph data stored in the storage module 14, and generates a graph based on the acquired records.

For example, in a case where the condition receiver 121 receives the condition "A", if the condition receiver 121 receives the graph display instruction, the graph generator 124 acquires records having time series parameters included in the range from 30 seconds to 130 seconds, from the graph data stored in the storage module 14.

In the example of FIG. 5, records each of which is a pair of a time series parameter and a numerical parameter and satisfies the condition "A" are (1, 10), (2, 21), (3, 31), (5, 15), (8, 52), (10, 23), (12, 25), (14, 1), (19, 44), (20, 12), (24, 2), (30, 11), . . . , and (130, 44). The graph generator 124 acquires those records from the storage module 14, and generates a graph representing the correspondence relation between the time series parameters and the numerical parameters.

The graph generator 124 supplies the generated graph to the graph display module 132.

Figure 8:
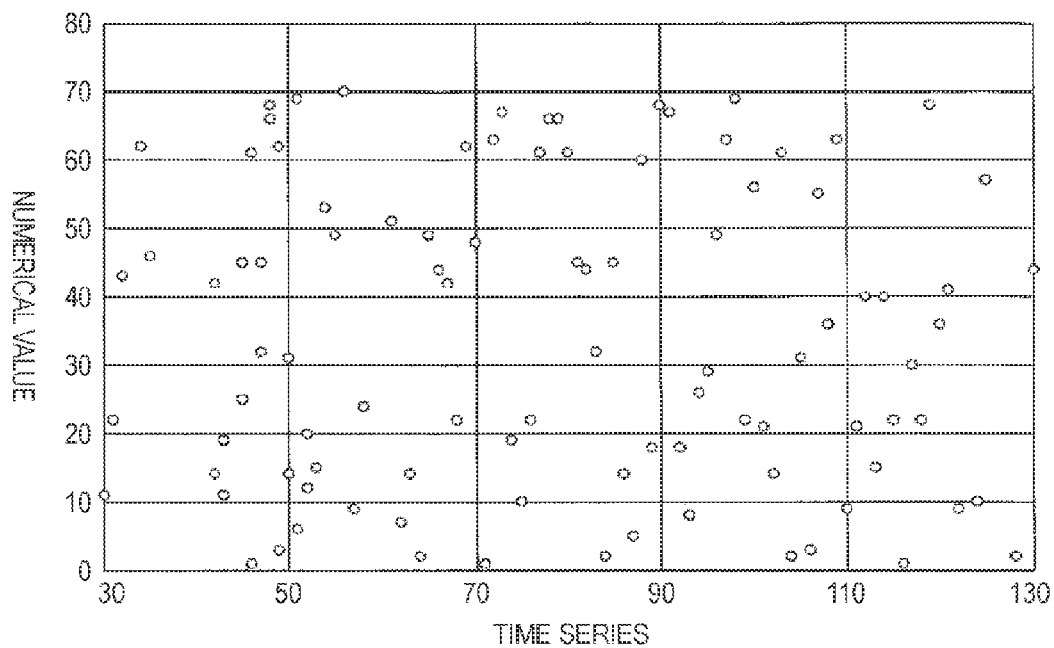
FIG. 8 is a view illustrating an example of a graph which a graph display module 132 displays.

In STEP S109, the graph display module 132 displays the supplied graph. FIG. 8 is a view illustrating an example of the graph which the graph display module 132 displays in a case where the condition receiver 121 receives the condition "A". In the present embodiment, the graph display module 132 displays a scatter plot on the graph display screen 104 of the display screen 100 shown in FIG. 1.

Until now, the process of the graph display system 1 has been described.

(First Modification)

The management data of the present embodiment has been described as data composed of management unit information and number-of-records information associated with each other. However, the management data may be composed of management unit information and record data size information associated with each other.

(Second Modification)

The time information of the present embodiment is not limited to a time, and may be the number of records, a record amount, a record size, a record scale, or any other value which is obtained using those values.

Also, with respect to each of the above described values, at least one threshold value may be set in advance, and the time information display module 131 may display, as the time information, information enabling the user to identify whether the corresponding value is equal to or less than the corresponding threshold value, or not.

That is, the time information of the present embodiment may be any information relative to a time necessary for graph display.

(Third Modification)

The time information display module 131 may not display the time information calculated by the time information calculator 122, as it is. For example, the time information display module 131 may change the unit of the time information and then display the time information, like "1.14 seconds", or may round off the value of the time information to the nearest whole number and display the nearest whole number, like "1 second". That is, the time information display method may be appropriately changed according to the specification of the graph display device and so on.

(Fourth Modification)

The condition of the present embodiment has been described as a condition for designating one or more time series parameters in the first element of the graph data stored in the storage module 14. However, a condition for designating a graph type as shown in the second modification may be added.

In this case, the time information calculator 122 may hold information composed of predetermined unit time information and graph type information associated with each other, and calculate the time information based on the acquired number-of-records information, the unit time information held in advance, and a received condition for designating a graph type.

(Fifth Modification)

With respect to the graph display system 1 of the present embodiment, a case where the instruction receiver 123 receives a graph display instruction (STEP S107) and then the graph generator 124 generates a graph as shown in FIG. 7 has been described. However, the graph generator 124 may start to generate a graph at the time when the condition receiver 121 receives a condition. In this case, if the instruction receiver 123 receives a graph display instruction, the graph generator 124 continues generating the graph; whereas if the condition receiver 121 receives any other condition, the graph generator 124 stops generating the graph.

(Sixth Modification)

In the present embodiment, an example in which a graph is generated from the graph data stored in the storage module 14 has been described. However, the storage module 14 may be a database (DB), and the graph display system 1 may display information acquired from the storage module 14 which is a DB. In this case, the graph data which is stored in the storage module 14 include search targets, and supplementary information items (such as keywords) associated with the search targets. Also, in the management data which the storage module 14 stores, search targets having a common supplementary information item may be set as a management unit. In this case, the management data is composed of supplementary information and number-of-records information associated with each other.

(Seventh Modification)

In the present embodiment, a case where the graph display device 2 is an information processing terminal, and includes the input module 11, the processing module 12, and the display module 13, and the server 3 includes the storage module 14 has been described. However, the graph display device 2 may include the input module 11 and the display module 13, and the server 3 may include the processing module 12.

Alternatively, the server 3 may not be used, and the graph display device 2 may include the input module 11, the processing module 12, the display module 13, and the storage module 14.

According to the present embodiment, even in a case where it takes a long time to generate and display a graph, since it is possible to show the user time information relative to a time necessary to display the graph, it is possible to reduce the psychological burden of the user. Especially, with respect to big data whose data amount to be handled is huge, since it may take several hours to several tens hours to display a graph, the present embodiment is useful.

Until now, the first embodiment has been described.

Second Embodiment

A graph display system 200 according to a second embodiment is different from the first embodiment in that graph data which is used for graph display is program structure data.

In the present embodiment, a program is a description of commands to an information processing apparatus, and is, for example, a source code described in a program language such as C language or JAVA (registered as a trade mark) language.

Figure 9:
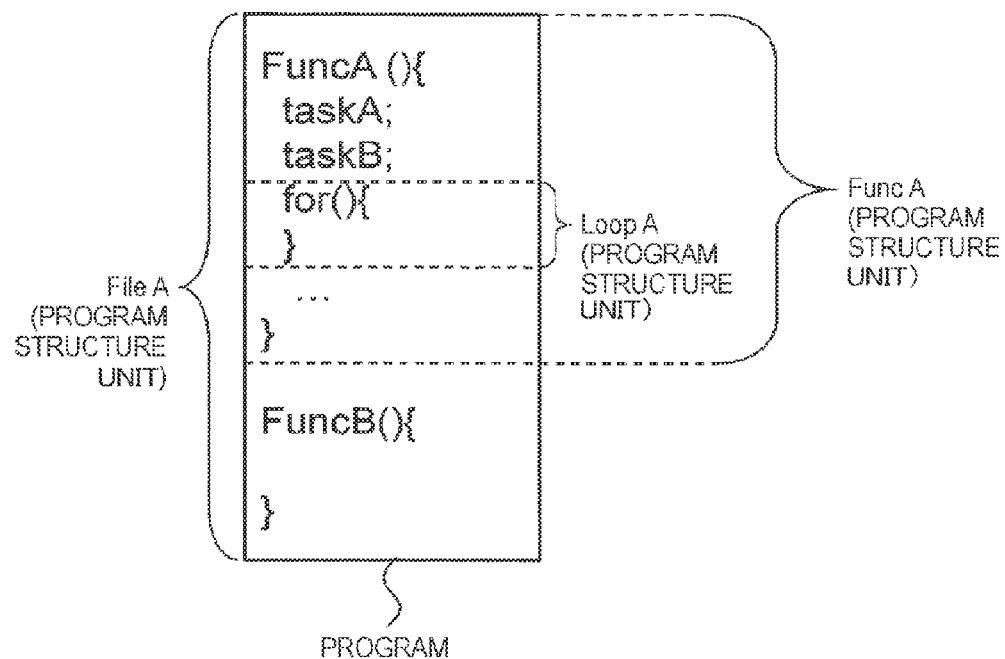
FIG. 9 is a view illustrating an example of a program.

FIG. 9 is a view illustrating an example of the program. A program (a source code) shown in FIG. 9 includes a plurality of program structure units. A program structure unit means a predetermined continuous section in the program. Examples of the program structure unit may include a file, a function, a loop, a conditional branch, and a scope.

That is, the program has a layered structure composed of a plurality of program structure units, and a program structure unit is or is not included in another program structure unit.

In the example of FIG. 9, a file "File A" contains a function "Func A". The function "Func A" contains a loop "Loop A". This loop "Loop A" is specified by an expression "File A: Func A: Loop A". That is, in the example of FIG. 9, "File A: Func A: Loop A" is established; whereas "File A: Func B: Loop A" is not established. Like this, the program represents the inclusion relation among the program structure units. Data representing the inclusion relation among the program structure units like "File A: Func A: Loop A" are referred to as program structure data.

Figure 10:
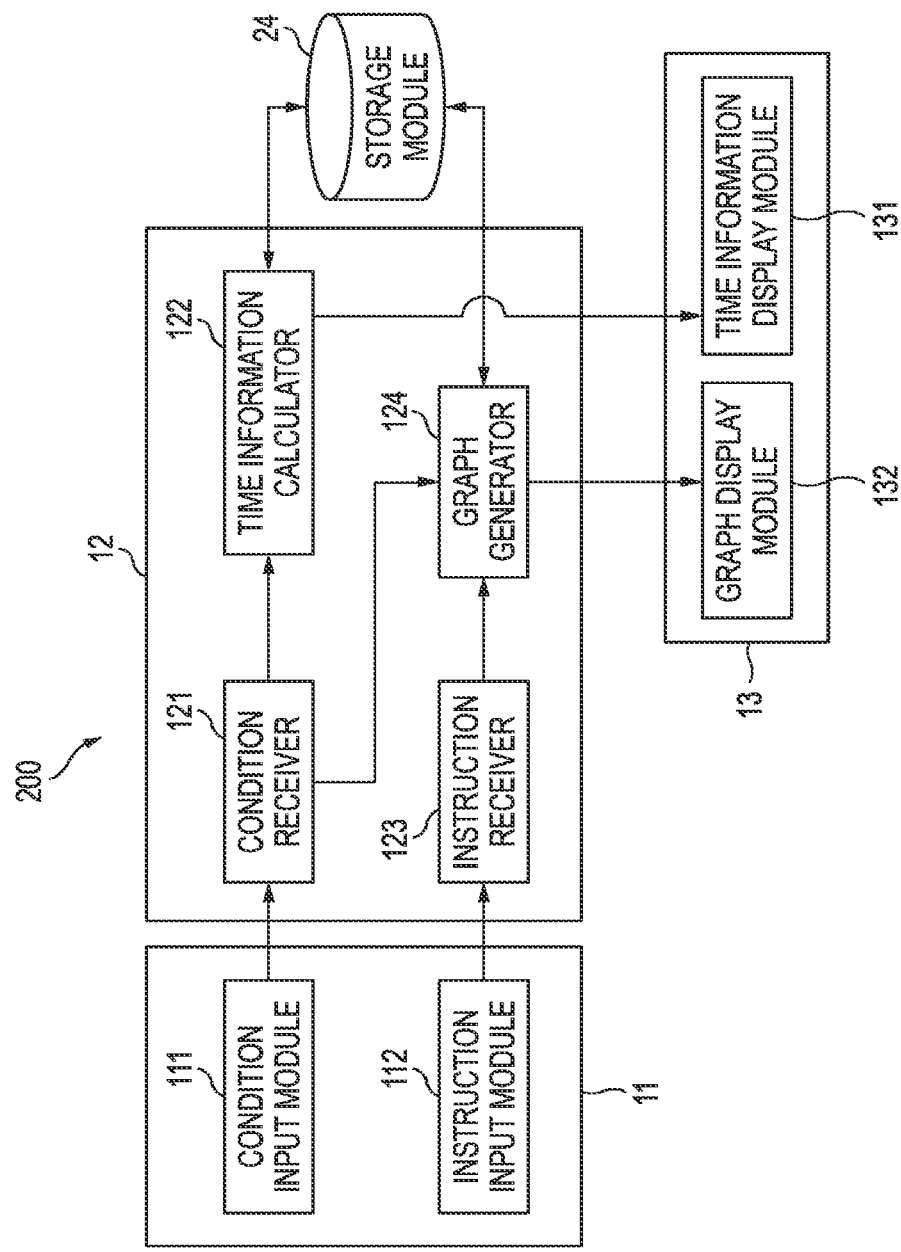
FIG. 10 is a view illustrating the functional blocks of a graph display system 200 according to a second embodiment.

FIG. 10 is a view illustrating the functional blocks of the graph display system 200. The graph display system 200 includes a storage module (which includes a storage circuitry, a memory and the like) 24, instead of the storage module 14, as compared to the graph display system 1 of the first embodiment. Similarly to the storage module 14 of the first embodiment, the storage module 24 stores graph data which is used for graph generation, and management data. However, the storage module 24 stores program structure data as the graph data.

Figure 11:
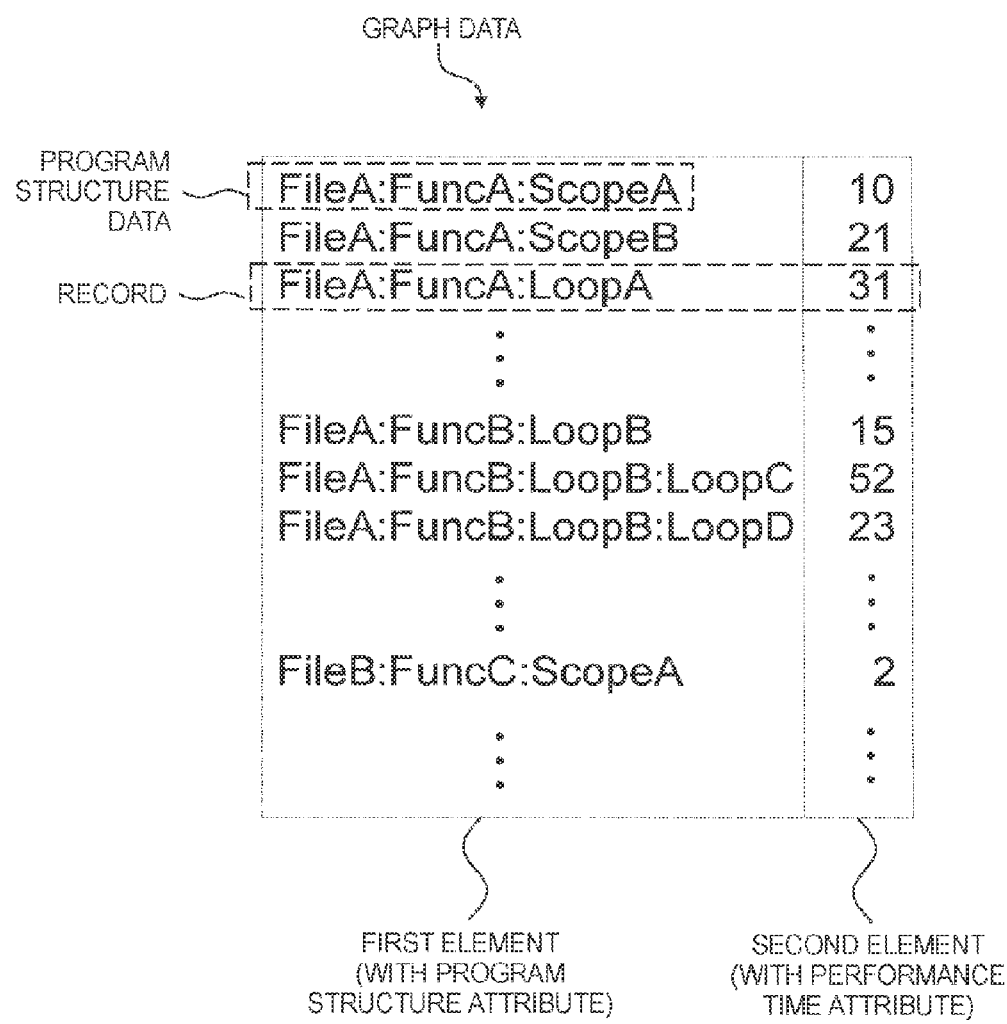
FIG. 11 is a view illustrating an example of graph data which a storage module 24 stores.

FIG. 11 is a view illustrating an example of the graph data which the storage module 24 stores. As shown in FIG. 11, the storage module 24 stores the graph data composed of a first element and a second element associated with each other. The first element includes a plurality of program structure data items. That is, the first element has a program structure attribute. The second element includes numerical data items (in this example, performance times (milliseconds)) corresponding to the program structure data items, respectively. That is, the second element has a performance time attribute. For example, in FIG. 11, it is shown that the performance time of a process corresponding to the loop "Loop A" expressed by "File A: Func A: Loop A" is 10 milliseconds. In the present embodiment, the numerical data may be any data which can be expressed by numbers corresponding to the program structure data. Examples of the numerical data of the present embodiment include a performance time, a memory access time, the number of memory access times, and the number of command performance times.

Also, in the present embodiment, a pair of a program structure data item and a performance time corresponding to the corresponding program structure data item is referred to as a record.

Figure 12:
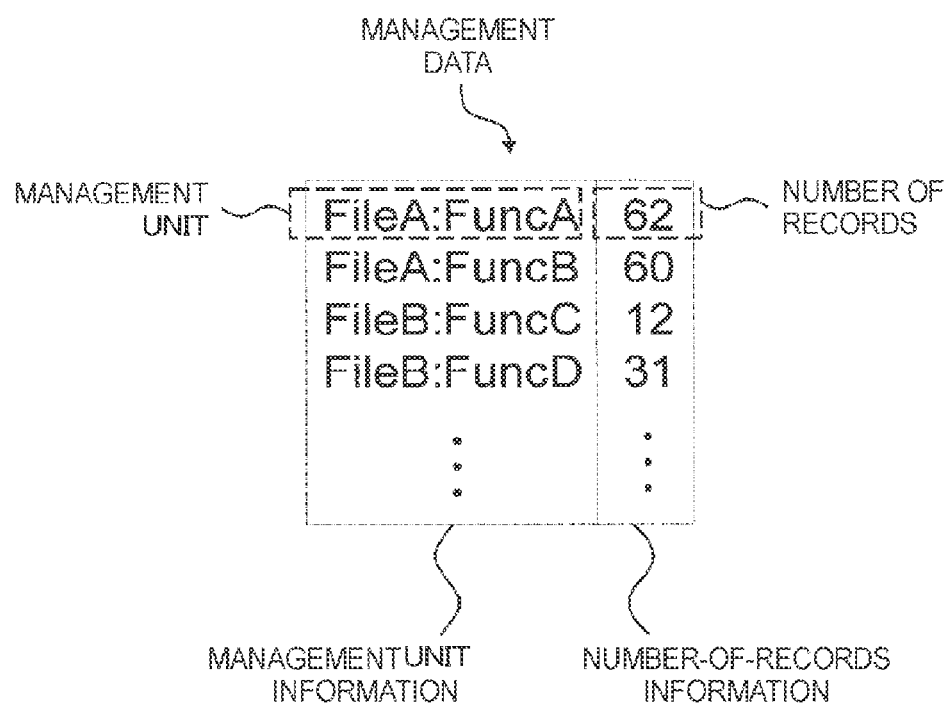
FIG. 12 is a view illustrating an example of management data which the storage module 24 stores.

FIG. 12 is a view illustrating an example of the management data which the storage module 24 stores. Similarly in the first element, the storage module 24 stores management unit information and number-of-records information in association with each other. Management units are determined according to a predetermined rule. In the present embodiment, program structure data specifying data structure units in layers higher than the bottom data structure unit of the layered structure are used as the management units. A number-of-records information item represents the number of records corresponding to a program structure data item included in a management unit. In the example of FIG. 12, it is shown that, in a management unit "File A: Func A", 62 records (program structure data items) exist.

Figure 13:
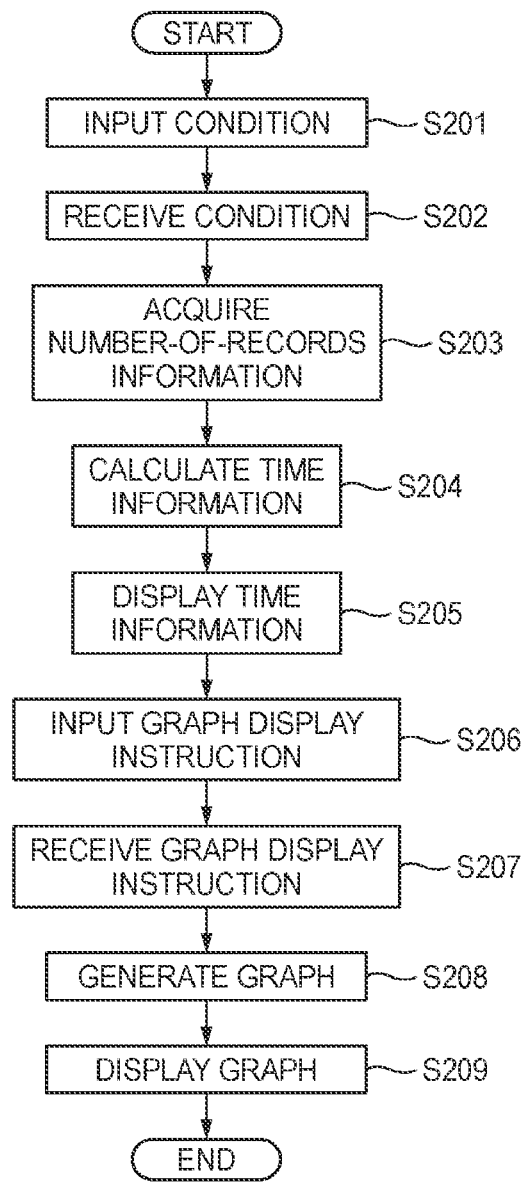
FIG. 13 is a flow chart illustrating a process of the graph display system 200.

FIG. 13 is a flow chart illustrating a process of the graph display system 200. The present embodiment is the same as the first embodiment in the basic process flow, but is different from the first embodiment in a condition which is received, and graph data and management data which are stored in the storage module 24. Therefore, the present embodiment will be described below taking an example. Also, in the present embodiment, a display screen is the same as the display screen 100 of the first embodiment.

In STEP S201, the condition input module 111 inputs a condition relative to a graph to be displayed, according to a designation of the user. In the present embodiment, a condition is for designating one or more program structure data items in the first element of the graph data stored in the storage module 24. For example, a condition of the present embodiment may be for designating one or more program structure units included in a specific program structure unit. Alternatively, a condition may for designating every program structure unit included in layers lower than a specific program structure unit.

In the present embodiment, the input condition is displayed on the condition input screen 101 of the display screen 100 shown in FIG. 1.

For example, the condition input module 111 inputs a condition to designate program structure data included in "File A", in the first element. This condition hereinafter will be referred to as a condition "B".

In STEP S202, the condition receiver 121 receives the input condition. The condition receiver 121 supplies the received condition to the time information calculator 122 and the graph generator 124.

In STEP S203, with reference to the management data of the storage module 24, the time information calculator 122 acquires number-of-records information corresponding to management unit information satisfying the received condition.

For example, in a case where the condition receiver 121 receives the condition "B", the time information calculator 122 searches the management unit information for management units representing that they are included in "File A", with reference to the management data of the storage module 24. In the case of FIG. 12, management unit information items "File A: Func A" and "File A: Func B" having management units starting with "File A:" satisfy the condition "B".

Therefore, the time information calculator 122 acquires a number-of-records information item "62" corresponding to the management unit "File A: Func A", and a number-of-records information item "60" corresponding to the management unit "File A: Func B".

In STEP S204, the time information calculator 122 calculates time information from the acquired number-of-records information.

Even in the present embodiment, similarly in the first embodiment, the time information calculator 122 calculates time information by multiplying the acquired number-of-records information and the unit time information. For example, in a case where the condition receiver 121 receives the condition "B", the time information calculator 122 multiplies the acquired number-of-records information "112 (=62+60)" and the unit time information (10 milliseconds per one record), thereby acquiring time information "1120 milliseconds (112 records×10 milliseconds)".

The time information calculator 122 supplies the calculated time information to the time information display module 131.

In STEP S205, the time information display module 131 displays the time information. In the present embodiment, the time information display module 131 displays the time information on the time information display screen 102 of the display screen 100 shown in FIG. 1.

For example, in a case where the condition receiver 121 receives the condition "B", the time information display module 131 displays the time information "1120 milliseconds" calculated by the time information calculator 122.

In STEP S206, the instruction input module 112 inputs a graph display instruction according to designation of the user.

Also, even in the present embodiment, with respect to STEP S206 and the subsequent steps, a case where a graph display instruction is input will be described. In a case where a graph display instruction is not input, the graph display system stands by in STEP S205, or transitions to STEP S201 in which a new condition is input.

In STEP S207, the instruction receiver 123 receives the graph display instruction input by the instruction input module 112. The instruction receiver 123 supplies the received instruction to the graph generator 124.

In STEP S208, the graph generator 124 acquires records corresponding to the condition received by the condition receiver 121, from the graph data stored in the storage module 14, and generates a graph based on the acquired records.

For example, in a case where the condition receiver 121 receives the condition "B", if the condition receiver 121 receives the graph display instruction, the graph generator 124 acquires records having program structure data included in "File A", from the graph data stored in the storage module 24.

In the example of FIG. 11, records each of which is a pair of a program structure data item and a performance time and satisfies the condition "B" are (File A: Func A: Scope A, 10), (File A: Func A: Scope B, 21), (File A: Func A: Loop A, 31), . . . , (File A: Func B: Loop B, 15), (File A: Func B: Loop B: Loop C, 52), (File A: Func B: Loop B: Loop D, 23), and the like. The graph generator 124 acquires those records from the storage module 24, and generates a graph representing the correspondence relation between the program structure data items and the performance times.

The graph generator 124 supplies the generated graph to the graph display module 132.

Figure 14:
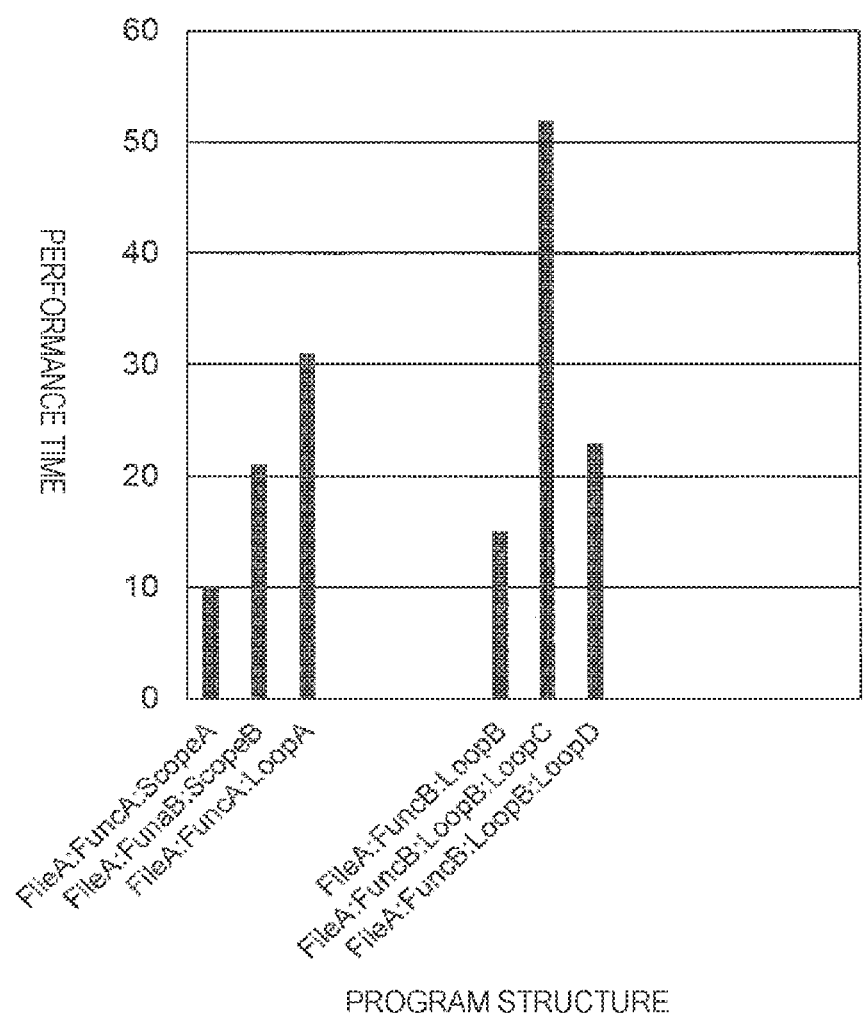
FIG. 14 is a view illustrating an example of the graph which the graph display module 132 displays.

In STEP S209, the graph display module 132 displays the supplied graph. FIG. 14 is a view illustrating an example of a graph which the graph display module 132 displays in a case where the condition receiver 121 receives the condition "B" In the present embodiment, the graph display module 132 displays a bar graph on the graph display screen 104 of the display screen 100 shown in FIG. 1.

Until now, the process of the graph display system 200 has been described.

(First Modification)

In the present embodiment, in the graph data which the storage module 24 stores, the first element includes a plurality of program structure data items, and the second element includes numerical data items corresponding to the program structure data items, respectively. However, the present invention is not limited thereto. For example, the second elements may be character data such as information representing CPU cores having performed processes corresponding to the program structure data items, respectively.

Figure 15:
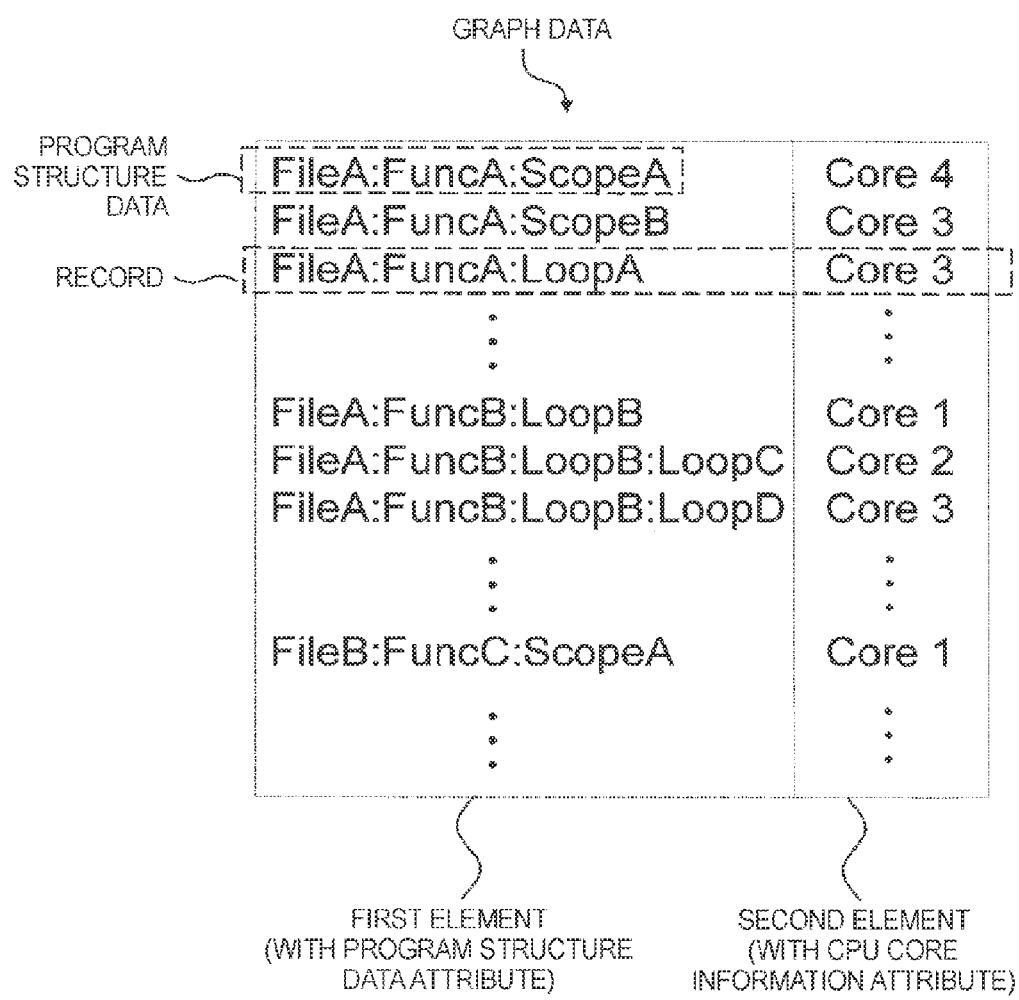
FIG. 15 is a view illustrating an example of the graph data which the storage module 24 stores.

FIG. 15 is a view illustrating an example of the graph data which the storage module 24 of the present modification stores. In the present modification, the second element is different from that in FIG. 11 in that it is CPU core information. That is, in this example, for example, it is shown that a CPU core having performed a process corresponding to a program structure data item "File A: Func A: Scope A" is "Core 4". Also, the management data of the present modification is the same as that in FIG. 12.

In this case, the graph generator 124 acquires records satisfying the received condition, from the storage module 24, and generates a graph representing the correspondence relation between the program structure data and the CPU core information.

Figure 16:
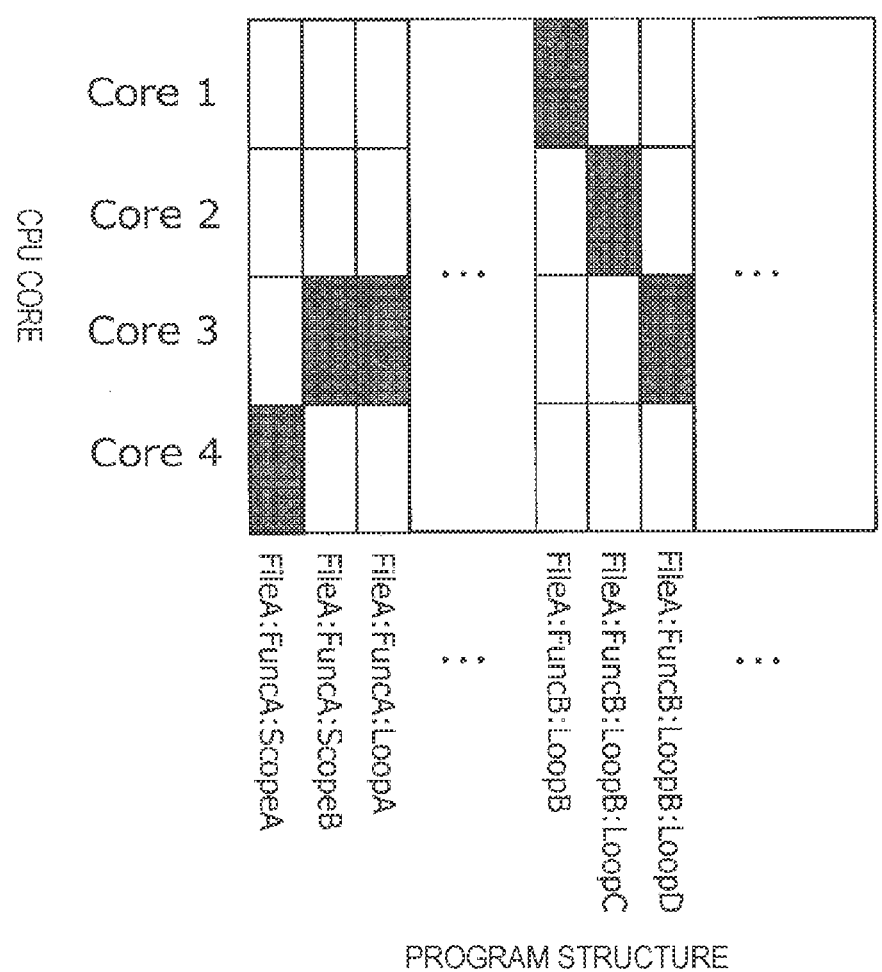
FIG. 16 is a view illustrating an example of the graph which the graph display module 132 displays.

FIG. 16 is a view illustrating an example of the graph which the graph display module 132 displays in a case where the condition receiver 121 receives the condition "B". In this example, the graph is a matrix map representing the correspondence between the program structure data items and cores by color coding. In the present embodiment, the graph display module 132 displays the corresponding matrix map on the graph display screen 104 of the display screen 100 shown in FIG. 1.

(Second Modification)

In addition to the first modification, the graph data which the storage module 24 stores may further include a third element. For example, the first element may be program structure data, and the second element may be numerical data (for example, the performance times described in the present embodiment), and the third element may be character data (for example, the CPU core information described in the first modification of the present embodiment).

FIG. 17 is a view illustrating an example of the graph data which the storage module 24 of the present modification stores. The present modification is different from the case of FIG. 15 in that CPU core information is added as the third element. That is, in this example, for example, it is shown that the performance time of a process corresponding to a program structure data item "File A: Func A: Scope A" is "10 milliseconds", and a CPU core having performed the corresponding process is "Core 4". Also, the management data of the present modification is the same as that in FIG. 12.

In this case, the graph generator 124 acquires the records satisfying the received condition, from the storage module 24, and generates a graph representing the correspondence relation among the program structure data, the performance times, and the CPU core information.

Figure 18:
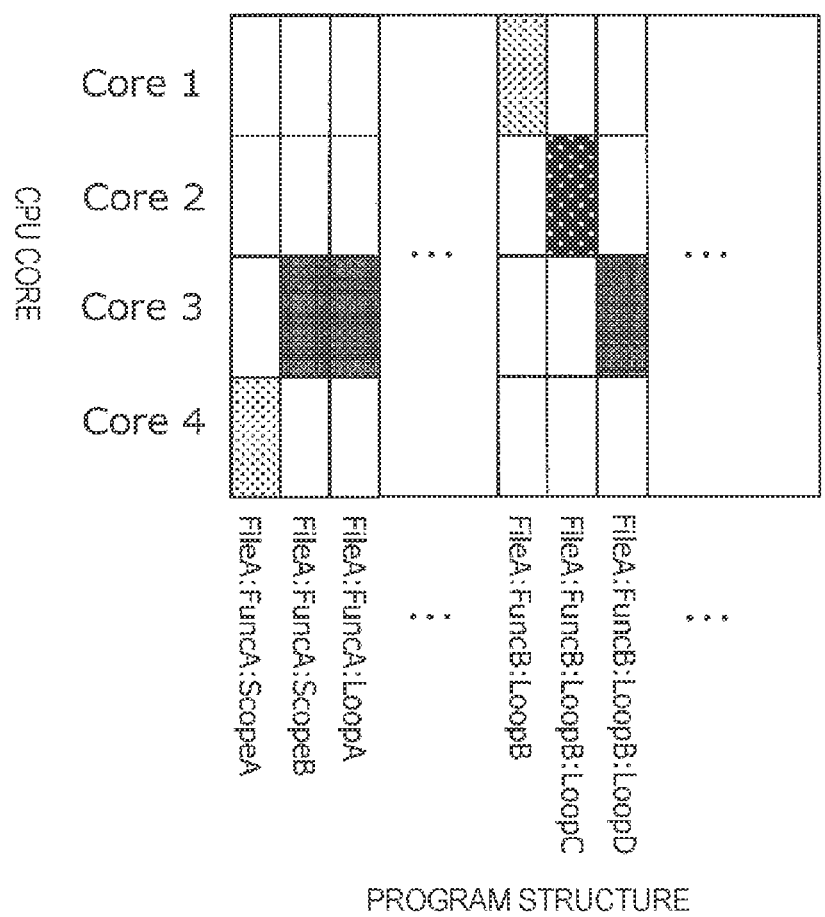
FIG. 18 is a view illustrating an example of the graph which the graph display module 132 displays.

FIG. 18 is a view illustrating an example of the graph which the graph display module 132 displays in a case where the condition receiver 121 receives the condition "B". In this example, the graph is a heat matrix map representing the correspondence between the program structure data items and the cores by color display and representing the performance times corresponding to the program structure data items, respectively, by color density. For example, the color density may be set so as to become higher as the performance time increases. Alternatively, the density may be divided according to whether the performance time is equal to or greater than a predetermined threshold value. In order to divide the density, a plurality of threshold values may be set. In the present modification, the graph display module 132 displays the corresponding heat matrix map on the graph display screen 104 of the display screen 100 shown in FIG. 1.

Also, the modifications described in the first embodiment can be similarly performed even in the present embodiment.

According to the present embodiment, in an apparatus which enables a user to check the execution state of a program using a graph in a case of making the corresponding program, even in a case where it takes a long time to generate and display a graph, since it is possible to show the user time information relative to a time necessary to display the graph, in advance, it is possible to reduce the psychological burden of the user. Especially, with respect to big data including a huge amount of program structure data to be handled, since it may take several hours to several tens hours to display a graph, the present embodiment is useful.

Until now, the second embodiment has been described.

According to the above described embodiments, it is possible to provide a graph display system or a graph display device very convenient for users.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A graph display device comprising:
one or more processors;
a memory that stores instructions that when executed by the one or more processors, performs operations, comprising:
receiving a condition for specifying at least one data item from graph data including a plurality of data items;

displaying time information relative to a time to display a graph based on the specified data item, on at least one display;
receiving an instruction for starting display of the graph; and
displaying the graph when the instruction is received, on the display, wherein
each of the plurality of data items has at least a common first element, and
a number of data items is managed in predetermined management units based on the common first element.

2. The graph display device of claim 1, wherein:
the condition is a condition for specifying the data item based on the first element.

3. The graph display device of claim 2, wherein:
the displaying the time information includes displaying the time information based on the management units, on the display.

4. The graph display device of claim 3, wherein:
the first element is a time series element,
the condition is a condition for specifying the data item based on the time series element, and
the management units are units obtained by dividing the time series element into predetermined sections.

5. The graph display device of claim 3, wherein:
the first element is a program structure element which represents a constitutional unit constituting a program,
the condition is a condition for specifying the data item based on the program structure element, and
the management units are units obtained by dividing the program structure element according to a predetermined rule.

6. The graph display device of claim 1, wherein:
the time information is based on at least one of a time, the number of data items, a data amount, a data size, a data scale, and existence or non-existence of a delay.

7. The graph display device of claim 1, wherein:
the time information is generated based on the number of data items in predetermined management units including the first element which meets the condition.

8. The graph display device of claim 1, wherein:
a process of displaying the graph stands by until an instruction for starting display of the graph is received after the data item is specified.

9. The graph display device according to claim 1, wherein:
the first element is divided in first units of a first range,
the number of data items is managed for each first units, and
the time to display a graph is determined based on the number of data items of one or more first units including the first element which meets the condition.

10. The graph display device according to claim 9, wherein:
the one or more processors receives a second range of the first element as the condition.

11. The graph display device according to claim 10, wherein:
a first range is different from a second range.

12. A graph display method comprising:
receiving a condition for specifying at least one data item from graph data including a plurality of data items;
displaying time information relative to a time to display a graph based on the specified data item according to the condition, on at least one display;
receiving an instruction for starting display of the graph; and
displaying the graph when the instruction is received, on the display, wherein
each of the plurality of data items has at least a common first element, and
a number of data items is managed in predetermined management units based on the common first element.

13. A non-transitory computer-readable medium storing a program that causes an electronic device to execute a graph display processing comprising:
receiving a condition for specifying at least one data item from graph data including a plurality of data items;
displaying time information relative to a time to display a graph based on the specified data item according to the condition, on at least one display;
receiving an instruction for starting display of the graph; and
displaying the graph when the instruction is received, on the display, wherein
each of the plurality of data items has at least a common first element, and
a number of data items is managed in predetermined management units based on the common first element.

14. A graph display device comprising:
one or more processors; and
a display;
wherein the one or more processors receives a condition for specifying one or more data items based on a first element from a plurality of data items, each of the plurality of data items has the first element,
the display displays time information relative to a time to display a graph based on a number of data items obtained by using the specified one or more data items,
the one or more processors receives an instruction for starting display of the graph after the display displays the time information, and
the display displays the graph after the instruction is received.

15. A control device comprising:
one or more processors; and
a communication device communicating with a display device through a network; wherein the one or more processors receives a condition for specifying one or more data items based on a first element from a plurality of data items, each of the plurality of data items has the first element,
the one or more processors send time information to the display device to display the time information, the time information relative to a time to display a graph based on a number of data items obtained by using the specified one or more data items,
the one or more processors receives an instruction for starting display of the graph after the display displays the time information, and
the one or more processors send graph data to the display device to display a graph after the instruction is received.

* * * * *